(12) United States Patent
Verdoliva et al.

(10) Patent No.: US 11,906,173 B2
(45) Date of Patent: Feb. 20, 2024

(54) CONNECTING ELEMENT FOR CONNECTING AN INDUCTION COIL TO A COIL CARRIER OF AN INDUCTION COOKING HOB

(71) Applicant: ELECTROLUX APPLIANCES AKTIEBOLAG, Stockholm (SE)

(72) Inventors: Valerio Verdoliva, Forli (IT); Alwin Neukamm, Rothenburg ob der Tauber (DE); Claudio Paolini, Forli (IT); Filippo Milanesi, Forli (IT); Laurent Jeanneteau, Forli (IT); Massimo Banzato, Forli (IT); Agostino Rossato, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/988,929

(22) Filed: Nov. 17, 2022

(65) Prior Publication Data
US 2023/0073251 A1    Mar. 9, 2023

Related U.S. Application Data

(62) Division of application No. 16/620,495, filed as application No. PCT/EP2018/063901 on May 28, 2018, now abandoned.

(30) Foreign Application Priority Data

Jun. 9, 2017 (EP) .................................. 17175262
Jul. 17, 2017 (EP) .................................. 17181577

(51) Int. Cl.
*F24C 7/06* (2006.01)
*H05B 6/12* (2006.01)
(Continued)

(52) U.S. Cl.
CPC ............ *F24C 7/067* (2013.01); *F16B 5/0621* (2013.01); *F16B 21/082* (2013.01);
(Continued)

(58) Field of Classification Search
CPC ........ F16B 5/0621; F16B 5/065; F16B 21/06; F16B 21/075; F16B 21/082; F16B 21/086;
(Continued)

(56) References Cited

U.S. PATENT DOCUMENTS 2,836,216 A    5/1958  Rapata
2,909,957 A    10/1959 Rapata
(Continued)

FOREIGN PATENT DOCUMENTS

DE    3242732 A1    6/1983
DE    3221979       12/1983
(Continued)

OTHER PUBLICATIONS

International Search Report and Written Opinion in PCT/EP2018/063901 dated May 28, 2018, 9 pages.
(Continued)

*Primary Examiner* — Matthew R McMahon
(74) *Attorney, Agent, or Firm* — Pearne & Gordon LLP

(57) ABSTRACT

A connecting element is provided for connecting an induction coil to a coil carrier of an induction cooking hob. The connecting element is made of an elastic material and formed as a single-piece part. The connecting element includes a first snap-fit portion connectable to a cut-out of the induction coil, and a spring portion arrangeable between the induction coil and the coil carrier, so that the spring portion provides a distance therebetween. The connecting element includes a second snap-fit portion extending oppo- (Continued)

Figure 1:
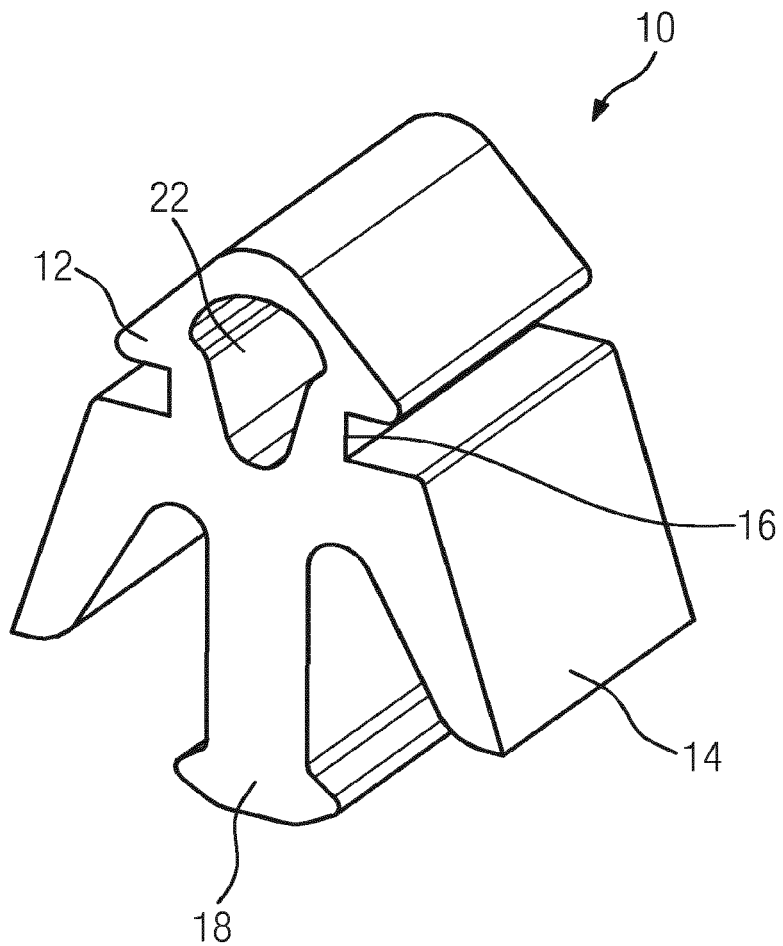

site to the first snap-fit portion. The second snap-fit portion is connectable to a cut-out of the coil carrier.

14 Claims, 5 Drawing Sheets

(51) Int. Cl.
*F16B 5/06* (2006.01)
*F16B 21/08* (2006.01)

(52) U.S. Cl.
CPC ......... *H05B 6/1209* (2013.01); *H05B 6/1245* (2013.01); *H05B 2206/022* (2013.01)

(58) Field of Classification Search
CPC ................ H05B 6/1209; H05B 6/1245; H05B 2206/022; F24C 7/067; H05K 7/142
See application file for complete search history.

(56) References Cited

U.S. PATENT DOCUMENTS

| | | | |
|---|---|---|---|
| 3,197,935 A | 8/1965 | Clancy | |
| 3,651,545 A * | 3/1972 | Hara | H05K 7/142 24/453 |
| 3,688,635 A | 9/1972 | Fegen | |
| 3,733,655 A | 5/1973 | Kolibar | |
| 3,777,052 A | 12/1973 | Fegen | |
| 4,114,339 A | 9/1978 | Ito | |
| 4,200,900 A * | 4/1980 | McGeorge | H05K 1/141 361/791 |
| 4,422,222 A | 12/1983 | Notoya | |
| 4,524,494 A * | 6/1985 | Sato | F16B 21/082 24/297 |
| 4,629,356 A | 12/1986 | Hayashi | |
| 5,966,782 A | 10/1999 | Ishihara | |
| 6,305,892 B1 | 10/2001 | Qiao | |
| 6,394,695 B1 | 5/2002 | Chausset | |
| 6,405,413 B2 | 6/2002 | Ichimaru | |
| 6,449,814 B1 | 9/2002 | Dinsmore | |
| 6,565,116 B1 * | 5/2003 | Tajima | F16B 21/075 24/297 |
| 6,668,429 B2 | 12/2003 | Fujisawa | |
| 6,796,006 B2 | 9/2004 | Hansen | |
| 7,686,266 B2 * | 3/2010 | Torigoe | F16B 21/088 24/297 |
| 8,056,193 B2 | 11/2011 | Park | |
| 9,603,202 B2 * | 3/2017 | Shaw | H05B 6/1245 |
| 9,702,387 B2 | 7/2017 | Harvey | |
| 10,455,649 B2 * | 10/2019 | Viroli | H05B 6/1209 |
| 10,731,685 B2 | 8/2020 | Uchida | |
| 2016/0007414 A1 | 1/2016 | Jeannateau | |
| 2016/0057815 A1 * | 2/2016 | Shaw | H05B 6/1254 219/622 |
| 2019/0162419 A1 * | 5/2019 | Neukamm | H05B 6/062 |

FOREIGN PATENT DOCUMENTS

| | | |
|---|---|---|
| DE | 10306813 | 8/2004 |
| DE | 102013011527 | 1/2015 |
| EP | 2079275 A1 | 7/2009 |
| EP | 2775785 A1 | 9/2014 |
| FR | 2517769 | 6/1983 |
| GB | 2111579 A | 7/1983 |
| KR | 20170069718 | 6/2017 |
| WO | 2012056646 | 5/2012 |
| WO | 2012077611 | 6/2012 |

OTHER PUBLICATIONS

International Search Report and Written Opinion in PCT/EP2018/063755 dated Sep. 4, 2018, 11 pages.

* cited by examiner

CONNECTING ELEMENT FOR CONNECTING AN INDUCTION COIL TO A COIL CARRIER OF AN INDUCTION COOKING HOB

CROSS REFERENCE TO RELATED APPLICATIONS

This application is a divisional of U.S. Ser. No. 16/620,495 filed on Dec. 7, 2019, which is a US National phase of PCT/EP2018/063901 filed on May 28, 2018. These application are incorporated herein by reference.

The present invention relates to a connecting element for connecting an induction coil to a coil carrier of an induction cooking hob. Further, the present invention relates to an induction cooking hob with at least one induction coil and at least one coil carrier. Moreover, the present invention relates to a method for assembling an induction coil to a coil carrier of an induction cooking hob.

The fastening of an induction coil on coil carrier of an induction cooking hob requires several elements. For example, a metal spring element is arranged between the induction coil and the coil carrier in order to push said induction coil towards a cooking panel arranged on the top side of the induction cooking hob. Further, at least one fastening element is provided for connecting the induction coil, the coil carrier and/or the spring element.

It is an object of the present invention to provide a connecting element for connecting an induction coil to a coil carrier of an induction cooking hob, which allows a reliable connection between the induction coil and the coil carrier by low complexity.

The object is achieved by the connecting element according to claim 1.

According to the present invention a connecting element for connecting an induction coil to a coil carrier of an induction cooking hob is provided, wherein:

the connecting element is made of an elastic material, the connecting element is formed as a single-piece part, the connecting element includes a first snap-fit portion connectable to a cut-out of the induction coil, so that the snap-fit portion and the cut-out form a snap-in mechanism, the connecting element includes a spring portion arrangeable between the induction coil and the coil carrier, so that the spring portion provides a distance between the induction coil and the coil carrier, the connecting element includes at least one groove enclosing at least partially the connecting element, the groove is engageable with the cut-out of the induction coil, the connecting element includes a second snap-fit portion extending opposite to the first snap-fit portion, and the second snap-fit portion is connectable to a cut-out of the coil carrier, so that the second snap-fit portion and the cut-out form a snap-in mechanism.

The main idea of the present invention is the connecting element formed as single-piece part, wherein said connecting element includes the first snap-fit portion, the second snap-fit portion, the groove and the spring portion. The snap-in mechanism formed by the first snap-fit portion, the groove and the cut-out of the induction coil allows a reliable fixation of the connecting element at the induction coil. In a similar way, the snap-in mechanism formed by the second snap-fit portion and the cut-out of the coil carrier allows a reliable fixation of the connecting element on the coil carrier. The spring portion allows an elastic support of the induction coil by the coil carrier. On the induction coil and on the coil carrier only cut-outs, but not any projecting elements, are required in order to fix the connecting element.

For example, the connecting element is made of silicone or rubber.

In particular, the at least one groove is arranged between the first snap-fit portion and the spring portion.

Further, the spring portion may include at least two wings arranged at opposite sides, wherein said wings extend outwards and away from the first snap-fit portion.

Preferably, the second snap-fit portion extends between the at least two wings of the spring portion.

Advantageously, the at least two parallel grooves are arranged at opposite sides of the connecting element.

In particular, the connecting element is formed as a profile section, wherein the profile axis extends parallel to the at least one groove.

Further, the first snap-fit portion may include a clearance hole, wherein preferably said clearance hole extends parallel to the profile axis.

Alternatively, the first snap-fit portion may be formed as a truncated pyramid.

Further, the present invention relates to an induction cooking hob with at least one induction coil and at least one coil carrier, wherein the induction cooking hob comprises a plurality of connecting elements according to any one of the preceding claims.

In particular, the induction coil includes a plurality of cut-outs adapted for receiving the snap-fit portion, wherein said cut-out is engaged or engageable with the groove.

Additionally, the coil carrier may include a plurality of cut-outs adapted for receiving the further snap-fit portion.

Preferably, the cut-outs of the induction coil and/or the cut-outs of the coil carrier have rectangular shapes.

Moreover, the present invention relates to a method for assembling at least one induction coil to a coil carrier for an induction cooking hob by using a plurality of connecting elements mentioned above, wherein the method comprises the steps of:

providing the coil carrier including a plurality of cut-outs, providing the at least one induction coil including a plurality of cut-outs, inserting a predetermined number of the of connecting elements into the corresponding selected cut-outs of the coil carrier by a robot, so that the second snap-fit portion of each connecting element penetrates the corresponding cut-out of the coil carrier, and setting the induction coil onto the inserted connecting elements by the robot, so that the first snap-fit portion of each connecting element penetrates the corresponding cut-out of the induction coil and the grooves of the connecting elements engage with the corresponding cut-outs of the induction coil.

At last, the present invention relates to an alternative method for assembling at least one induction coil to the coil carrier for an induction cooking hob by using a plurality of connecting elements mentioned above, wherein the method comprises the steps of:

providing the at least one induction coil including a plurality of cut-outs, providing the coil carrier including a plurality of cut-outs, inserting a predetermined number of the connecting elements into the corresponding selected cut-outs of the induction coil by a robot, so that the first snap-fit portion of each connecting element penetrates the corresponding cut-out of the induction coil and the grooves of the connecting elements engage with the corresponding cut-outs of the induction coil, and setting the induction coil with the connecting elements onto the coil carrier, so that the second snap-fit portion of each connecting element penetrates the corresponding cut-out of the coil carrier.

The fixation of the connecting elements at the induction coil is very rigid.

Furthermore, a component supplier may provide induction coils including the plurality of cut-outs, wherein the connecting elements are already inserted in the corresponding selected cut-outs.

Novel and inventive features of the present invention are set forth in the appended claims.

Figure 2:
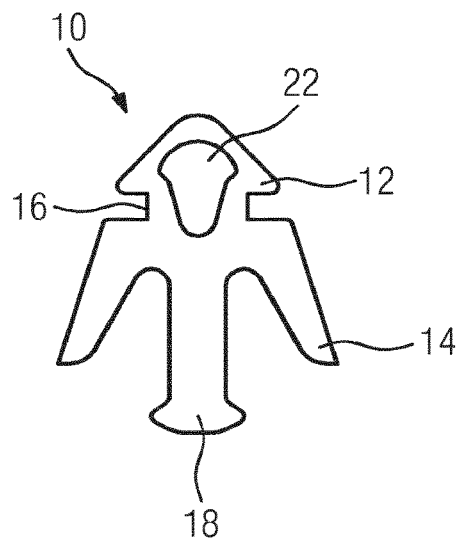
Figure 3:
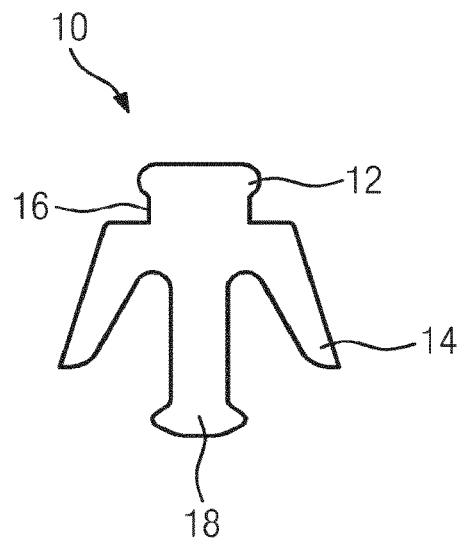
Figure 4:
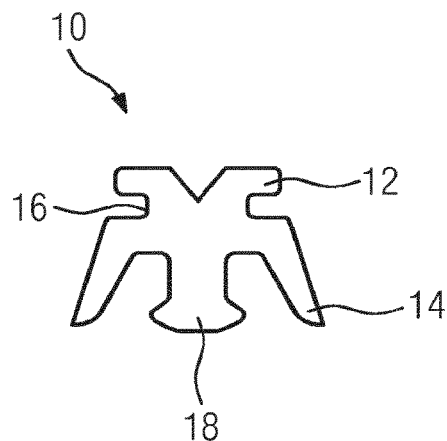
Figure 5:
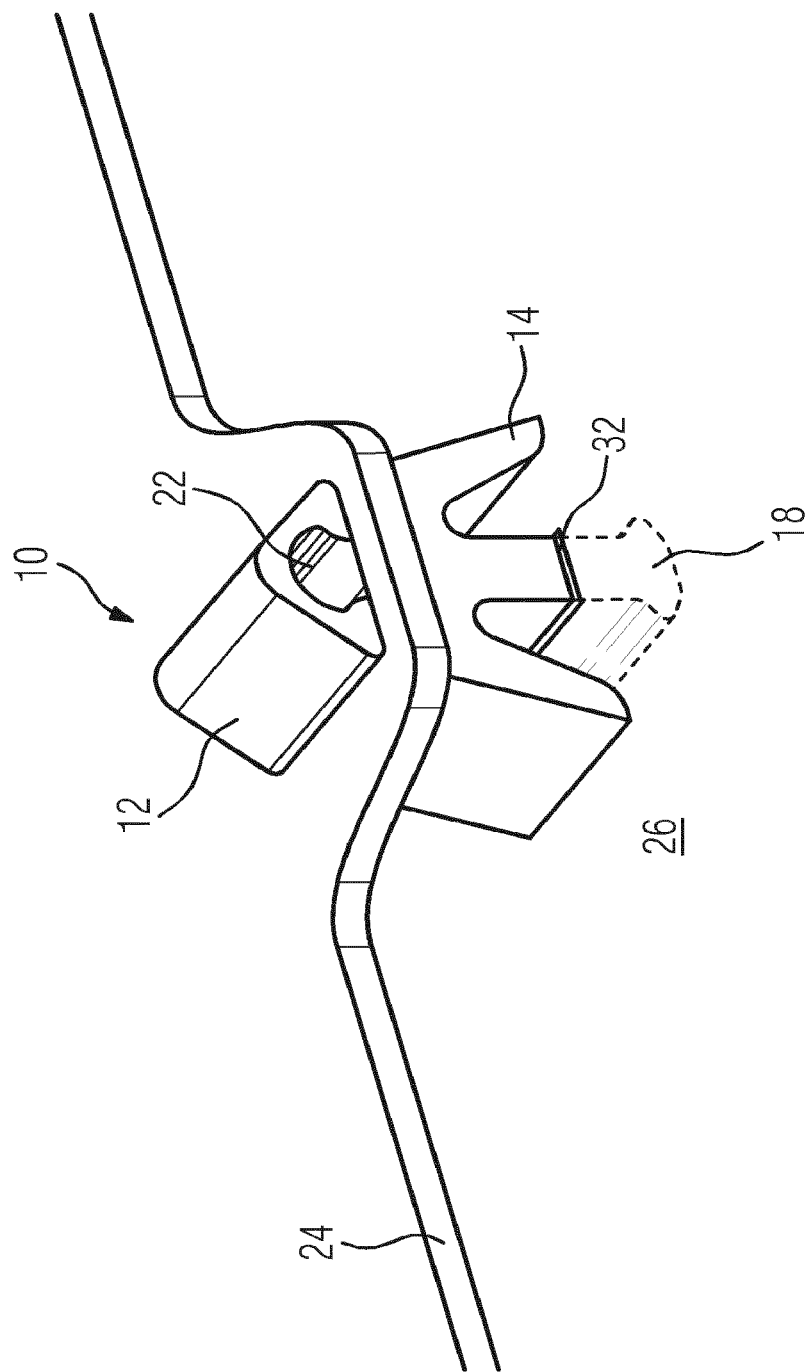
Figure 6:
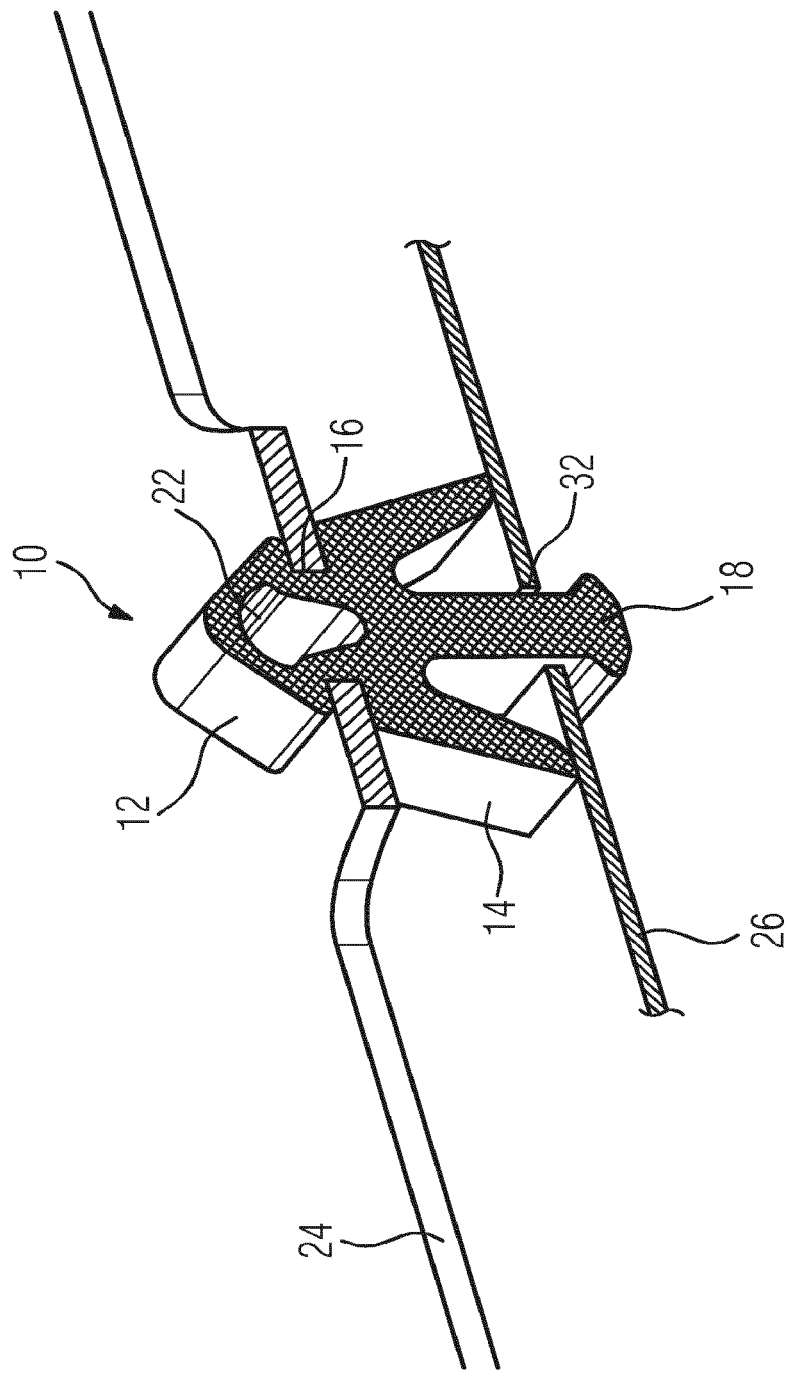
Figure 7:
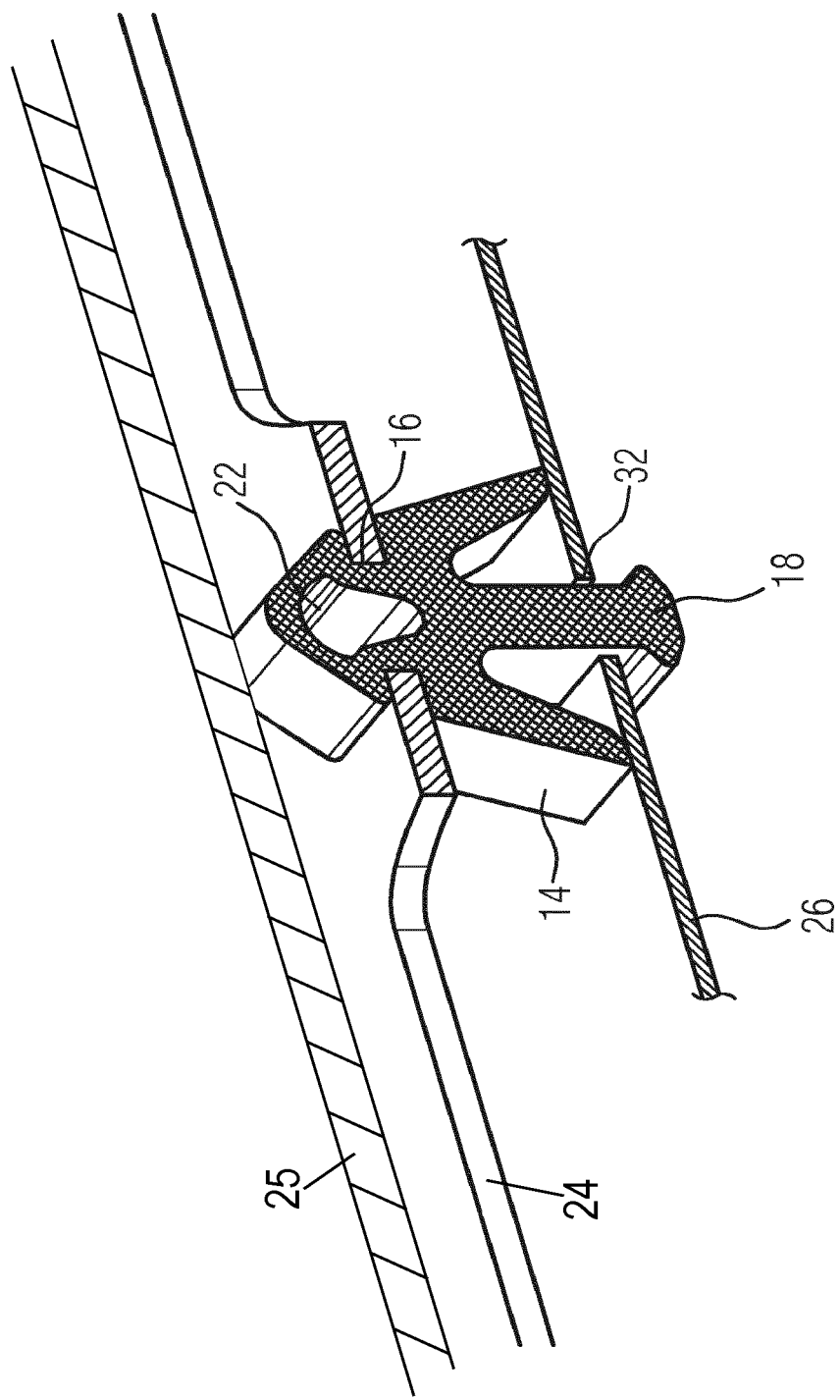

The present invention will be described in further detail with reference to the drawing, in which FIG. 1 illustrates a schematic perspective view of a connecting element according to a first embodiment of the present invention, FIG. 2 illustrates a schematic front view of the connecting element according to the first embodiment of the present invention, FIG. 3 illustrates a schematic front view of the connecting element according to a second embodiment of the present invention, FIG. 4 illustrates a schematic front view of the connecting element according to a third embodiment of the present invention, FIG. 5 illustrates a schematic perspective view of the connecting element interconnected between the induction coil and the coil carrier according to the first embodiment of the present invention, FIG. 6 illustrates a schematic perspective sectional view of the connecting element interconnected between the induction coil and the coil carrier according to the first embodiment of the present invention, and FIG. 7 illustrates a schematic perspective sectional view of the connecting element interconnected between the induction coil and the coil carrier and disposed beneath a cooking panel according to the first embodiment of the present invention.

FIG. 1 illustrates a schematic perspective view of a connecting element 10 according to a first embodiment of the present invention. The connecting element 10 is made of an elastic material. Preferably, the connecting element 10 is made of silicone or rubber.

In this example, the connecting element 10 has the shape of a profile section, so that the cross-section of said connecting element 10 along a profile axis is constant. The connecting element 10 includes a first snap-fit portion 12, a spring portion 14 and a second snap-fit portion 18. The first snap-fit portion 12 is substantially formed as a prism extending along the profile axis. The width of the first snap-fit portion 12 decreases with the distance from the spring portion 14. The spring portion 14 includes two wings arranged at opposite sides. Said wings extend outwards and away from the first snap-fit portion 12. Two parallel grooves 16 are formed between the first snap-fit portion 12 and the spring portion 14. Said grooves 16 are arranged at opposite sides. The grooves 16 extend parallel to the profile axis. Each groove 16 is arranged between the first snap-fit portion 12 and one wing of the spring portion 14. The second snap-fit portion 18 is arranged opposite to the first snap-fit portion 12. Moreover, the first snap-fit portion 12 includes a clearance hole 22 extending along the profile axis. Thus, the first snap-fit portion 12 is a flexible hose with a triangular cross-section.

The connecting element 10 is provided for connecting an induction coil 24 to a coil carrier 26 of an induction cooking hob, wherein the distal ends of the wings of the spring portion 14 are aligned on the coil carrier 26. The first snap-fit portion 12 is penetrable into a cut-out of the induction coil 24. Preferably, said cut-out is rectangular. For example, the cut-out may be formed in an aluminium sheet of the induction coil 24. The grooves 16 of the connecting element 10 are engaged or engageable with the cut-out of the induction coil 24. The second snap-fit portion 18 is penetrable into a cut-out of the coil carrier 24. Preferably, said cut-out is also rectangular.

FIG. 2 illustrates a schematic front view of the connecting element 10 according to the first embodiment of the present invention. FIG. 2 clarifies the cross-section of the connecting element 10 of the first embodiment. The first snap-fit portion 12 is hollow and hence easily deformable. Thus, the first snap-fit portion 12 can be inserted into the cut-out of the induction coil 24 by little effort.

FIG. 3 illustrates a schematic front view of the connecting element 10 according to a second embodiment of the present invention. Also the connecting element 10 of the second embodiment has the shape of a profile section.

The connecting element 10 includes the first snap-fit portion 12, the spring portion 14 and the second snap-fit portion 18. The first snap-fit portion 12 is substantially formed as a cuboid extending along the profile axis. The spring portion 14 includes two wings arranged at opposite sides. Said wings extend outwards and away from the first snap-fit portion 12. Two grooves 16 are formed between the first snap-fit portion 12 and the spring portion 14. The grooves 16 extend parallel to each other and are arranged at opposite sides. The grooves 16 extend along the profile axis. Each groove 16 is arranged between the first snap-fit portion 12 and one wing of the spring portion 14. The second snap-fit portion 18 is arranged opposite to the first snap-fit portion 12. The second snap-fit portion 18 is penetrable into the cut-out of the coil carrier 24.

FIG. 4 illustrates a schematic front view of the connecting element 10 according to a third embodiment of the present invention. The connecting element 10 of the third embodiment also has the shape of a profile section.

The connecting element 10 includes the first snap-fit portion 12, the spring portion 14, the grooves 16 and the second snap-fit portion 18. The first snap-fit portion 12 is substantially formed as a cuboid with a hollow. Said hollow is arranged opposite to the second snap-fit portion 18 and extends along the profile axis. The spring portion 14 includes the two wings arranged at opposite sides. Said wings extend outwards and away from the first snap-fit portion 12. Two grooves 16 are formed between the first snap-fit portion 12 and the spring portion 14. The grooves 16 extend parallel to each other and are arranged at opposite sides. The grooves 16 extend along the profile axis. Each groove 16 is arranged between the first snap-fit portion 12 and one wing of the spring portion 14. The connecting element 10 includes the second snap-fit portion 18 arranged opposite to the first snap-fit portion 12, wherein said second snap-fit portion 18 is penetrable into the cut-out of the coil carrier 24.

FIG. 5 illustrates a schematic perspective view of the connecting element 10 interconnected between the induction coil 24 and the coil carrier 26 according to the first embodiment of the present invention.

The induction coil 24 is arranged above the coil carrier 26. The connecting element 10 is fastened at the induction coil 24 and at the coil carrier 26. The connecting element 10 is penetrated in the induction coil 24, wherein the first snap-fit portion 12 of said connecting element 10 is arranged above the induction coil 24. The spring portion 14 of the connecting element 10 is arranged between the induction coil 24 and the coil carrier 26. The grooves 16 of the connecting element 10 engage with the cut-out in the induction coil 24. For example, the cut-out of the induction coil 24 is formed in an aluminium disk of said induction coil 24. The distal ends of the wings of the spring portion 14 are supported by the coil carrier 26. The second snap-fit portion 18 of the connecting element 10 penetrates the cut-out 32 in the coil carrier 26. The second snap-fit portion 18 of the connecting element 10 and the cut-out 32 of the coil carrier 26 form a snap-in mechanism.

FIG. 6 illustrates a schematic perspective sectional view of the connecting element 10 interconnected between the induction coil 24 and the coil carrier 26 according to the first embodiment of the present invention.

At least one connecting element 10 is provided for connecting the induction coil 24 to the coil carrier 26. For example, three connecting elements 10 are provided for connecting the induction coil 24 to the coil carrier 26.

The connecting element 10 is fastened at the induction coil 24 and at the coil carrier 26. The first snap-fit portion 12 of said connecting element 10 is fastened above the induction coil 24, while the spring portion 14 of the connecting element 10 is arranged between the induction coil 24 and the coil carrier 26. The grooves 16 of the connecting element 10 engage with the cut-out in the induction coil 24. The distal ends of the wings of the spring portion 14 are supported by the coil carrier 26. The second snap-fit portion 18 of the connecting element 10 penetrates the cut-out 32 in the coil carrier 26.

The connecting element 10 according to the present invention is fixable on the coil carrier 26 without a bent sheet metal finger or any other projecting element. The cut-out 32 in the coil carrier 26 is sufficient for fixing the connecting element 10 by the second snap-fit portion 18. The concept of the cut-outs 32 in the coil carrier 26 allows a modular coil carrier 26. A plurality of arrangements of the cut-outs 32 in the coil carrier 26 allows that one coil carrier 26 is provided for different induction cooking hobs.

Moreover, the spring element 14 of the connecting element 10 pushes the induction coil 24 towards against a cooking panel 25 (schematically shown in cross-section in FIG. 7) arranged on the top side of the induction cooking hob. The connecting element 10 does not require any steel spring elements because of the spring portion 14. The inventive connecting element 10 does not require any space beneath the coil carrier 26. The connecting element 10 may be used for already existing induction coils 24 and coil carriers 26.

The first snap-fit portion 10 and the second snap-fit portion 18 of the connecting element 10 allow an automatic assembling of the induction coil 24 on the coil carrier 26 by an assembling line. The connecting element 10 with the snap-fit portion 10 and the second snap-fit portion 18 allows the assembling of the induction coil 24 on the coil carrier 26 by a robot. The first snap-fit portion 12 and the cut-out in the induction coil 24 form the snap-in mechanism between the induction coil 24 and the connecting element 10, while the second snap-fit portion 18 and the cut-out 32 in the coil carrier 26 form a snap-in mechanism between the coil carrier 26 and the connecting element 10.

The connecting element 10 is provided for a method for assembling the induction coil 24 to the coil carrier 26, wherein the coil carrier 26 with the plurality of cut-outs 32 and one or more induction coils 24 with the plurality of cut-outs are provided.

For example, the connecting elements 10 are inserted into the corresponding selected cut-outs 32 of the coil carrier 26 by a robot, so that the second snap-fit portion 18 of each connecting element 10 penetrates the corresponding cut-out 32 of the coil carrier 26, and then the induction coil 24 is set onto the inserted connecting elements 10 by the robot, so that the first snap-fit portion 12 of each connecting element 10 penetrates the corresponding cut-out of the induction coil 24 and the grooves 16 of the connecting elements 10 engage with the corresponding cut-outs of the induction coil 24.

Alternatively, the connecting elements 10 are inserted into the corresponding selected cut-outs of the induction coil 24 by a robot, so that the first snap-fit portion 12 of each connecting element 10 penetrates the corresponding cut-out of the induction coil 24 and the grooves 16 of the connecting elements 10 engage with the corresponding cut-outs of the induction coil 24, and then the induction coil 24 with the connecting elements 10 is set onto the coil carrier 26, so that the second snap-fit portion 18 of each connecting element 10 penetrates the corresponding cut-out of the coil carrier 26. The fixation of the connecting elements at the induction coil is very rigid.

Furthermore, a component supplier may provide induction coils including the plurality of cut-outs, wherein the connecting elements are already inserted in the corresponding selected cut-outs.

Although illustrative embodiments of the present invention have been described herein with reference to the accompanying drawings, it is to be understood that the present invention is not limited to those precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 connecting element
12 first snap-fit portion
14 spring portion
16 groove
18 second snap-fit portion
22 clearance hole
24 induction coil
25 cooking panel
26 coil carrier
32 cut-out

The invention claimed is:

1. An induction cooking hob, comprising:
an induction cooking panel configured to support a cooking utensil thereon, an induction coil disposed beneath the induction cooking panel, a coil carrier, and a connecting element that connects the induction coil to the coil carrier;
the connecting element being a single-piece part made of elastic material and formed as a profile section having a constant cross-section along an entire length of the connecting element along a profile axis thereof, the connecting element comprising:
a first snap-fit portion,
a spring portion configured to maintain a separation between the induction coil and the coil carrier against a compressive counter-force, said spring portion having a width in cross-section that continuously tapers narrower toward the first snap-fit portion, a pair of opposing and substantially coplanar grooves extending parallel to the profile axis at either lateral side of the connecting element and being located between the first snap-fit portion and the spring portion, said first snap-fit portion having a lateral dimension that at least partially decreases with increased distance from said grooves, said spring portion comprising a pair of opposing wings respectively extending downward from said grooves and away from one another at either lateral side of the connecting element, and a second snap-fit portion extending opposite the first snap-fit portion between said opposing wings.

2. The induction cooking hob according to claim 1, said first snap-fit portion comprising a triangular shape in cross-section.

3. The induction cooking hob according to claim 2, said first snap-fit portion comprising a clearance hole therein that extends parallel to said profile axis.

4. The induction cooking hob according to claim 1, said first snap-fit portion extending upward above said induction coil through a first cut-out therein, said spring portion extending downward below said induction coil, and said induction coil being received and engaged in said grooves, said spring portion resting on said coil carrier to thereby support the induction coil thereon, said spring portion being resilient thereby pushing the induction coil upward toward and against said induction cooking panel.

5. The induction cooking hob according to claim 4, said connecting element acting as a spacer that prohibits direct physical contact between said coil carrier and said induction coil.

6. The induction cooking hob according to claim 4, said second snap-fit portion extending downward through a second cut-out in said coil carrier to thereby fix a lateral position of said connecting element on said coil carrier.

7. The induction cooking hob according to claim 6, said first snap-fit portion and said second snap-fit portion being aligned along a common single axis so that said induction coil can be connected to said coil carrier via said connecting element robotically via single-axis compression therebetween.

8. The induction cooking hob according to claim 1, further comprising a plurality of said connecting elements, wherein the induction coil includes a plurality of first cut-outs configured to receive the first snap-fit portions of respective ones of said plurally of connecting elements.

9. The induction cooking hob according to claim 8, wherein the coil carrier includes a plurality of second cut-outs configured to receive the second snap-fit portions of respective ones of said plurality of connecting elements.

10. The induction cooking hob according to claim 9, said plurality of first cut-outs of the induction coil and/or said plurality of second cut-outs of the coil carrier having rectangular shapes.

11. The induction cooking hob according to claim 1, said second snap-fit portion being a single-columnar element.

12. The induction cooking hob according to claim 11, said second snap-fit portion having a width that increases towards a distal end thereof.

13. The induction cooking hob according to claim 12, wherein the second snap-fit portion is received within a cut-out formed in said coil carrier, and wherein a maximum width of said second snap-fit portion is greater than a width of said cut-out.

14. A method for assembling the induction coil to the coil carrier for the induction cooking hob according to claim 1, the method comprising the steps of:

providing the induction coil including a plurality of first cut-outs formed therein;

providing the coil carrier including a plurality of second cut-outs formed therein;

providing a plurality of the connecting elements;

inserting a predetermined number of the connecting elements into corresponding selected ones of said first cut-outs of the induction coil, so that the first snap-fit portion of each said connecting element penetrates the corresponding first cut-out of the induction coil and the grooves of the respective connecting elements engage with the corresponding first cut-outs of the induction coil, and setting the induction coil with the connecting elements onto the coil carrier, so that the second snap-fit portion of each said connecting element penetrates a corresponding one of said second cut-outs of the coil carrier.

* * * * *